United States Patent [19]

Helbig et al.

[11] 4,336,844

[45] Jun. 29, 1982

[54] FARM IMPLEMENT

[75] Inventors: William H. Helbig; Barry F. Cornell, both of Corpus Christi, Tex.

[73] Assignee: Lehman-H Feeder & Plow, Inc., Corpus Christi, Tex.

[21] Appl. No.: 188,256

[22] Filed: Sep. 19, 1980

Related U.S. Application Data

[63] Continuation of Ser. No. 1,435, Jan. 8, 1979, abandoned.

[51] Int. Cl.³ ..................... A01B 13/08; A01B 13/02
[52] U.S. Cl. ................................ 172/140; 172/155; 172/196; 172/448; 172/451; 172/691; 172/700; 172/688
[58] Field of Search ............... 172/138, 140, 141, 152, 172/153, 155, 156, 195, 196, 157, 174, 175, 177, 149, 448, 159, 451, 699, 700, 688, 701, 470, 133, 635; 111/85, 52

[56] References Cited

U.S. PATENT DOCUMENTS

| | | | |
|---|---|---|---|
| 2,734,439 | 2/1956 | Padrick | 172/56 |
| 3,235,013 | 2/1966 | Kirpatrick | 172/635 X |
| 3,289,771 | 12/1966 | Bennett | 172/155 |
| 3,396,804 | 8/1968 | Rogers | 172/196 |
| 3,554,296 | 1/1971 | Lehman | 172/700 |
| 3,559,747 | 2/1971 | Cline | 172/699 |
| 3,667,550 | 6/1972 | Lehman | 172/700 |
| 3,734,195 | 5/1973 | Cantral | 172/413 |
| 4,024,921 | 5/1977 | Tibbs | 172/196 |
| 4,230,054 | 10/1980 | Hatcher | 172/133 |

OTHER PUBLICATIONS

Amco Rippin Buster, Advertising Brochure of Amco, Yazoo City, Miss.

Primary Examiner—Richard J. Johnson
Attorney, Agent, or Firm—Vaden, Eickenroht, Thompson, Bednar & Jamison

[57] ABSTRACT

There is disclosed a farm implement having a frame connectible to a tractor by means of a three-point hitch to permit it to be moved forwardly over the ground level, a first set of chisels supported on the frame in laterally spaced-apart relation, a second set of chisels supported on the frame rearwardly of the first set and laterally intermediate laterally adjacent chisels of the first set, and a lister mounted on each chisel of the second set with its lower edge above the lower edge of the chisel of the second set. In use of the implement, the first set of chisels form longitudinally extending trenches in the ground, and the listers mounted on the chisels of the second set turn the soil toward the trenches in order to build beds thereover.

5 Claims, 5 Drawing Figures

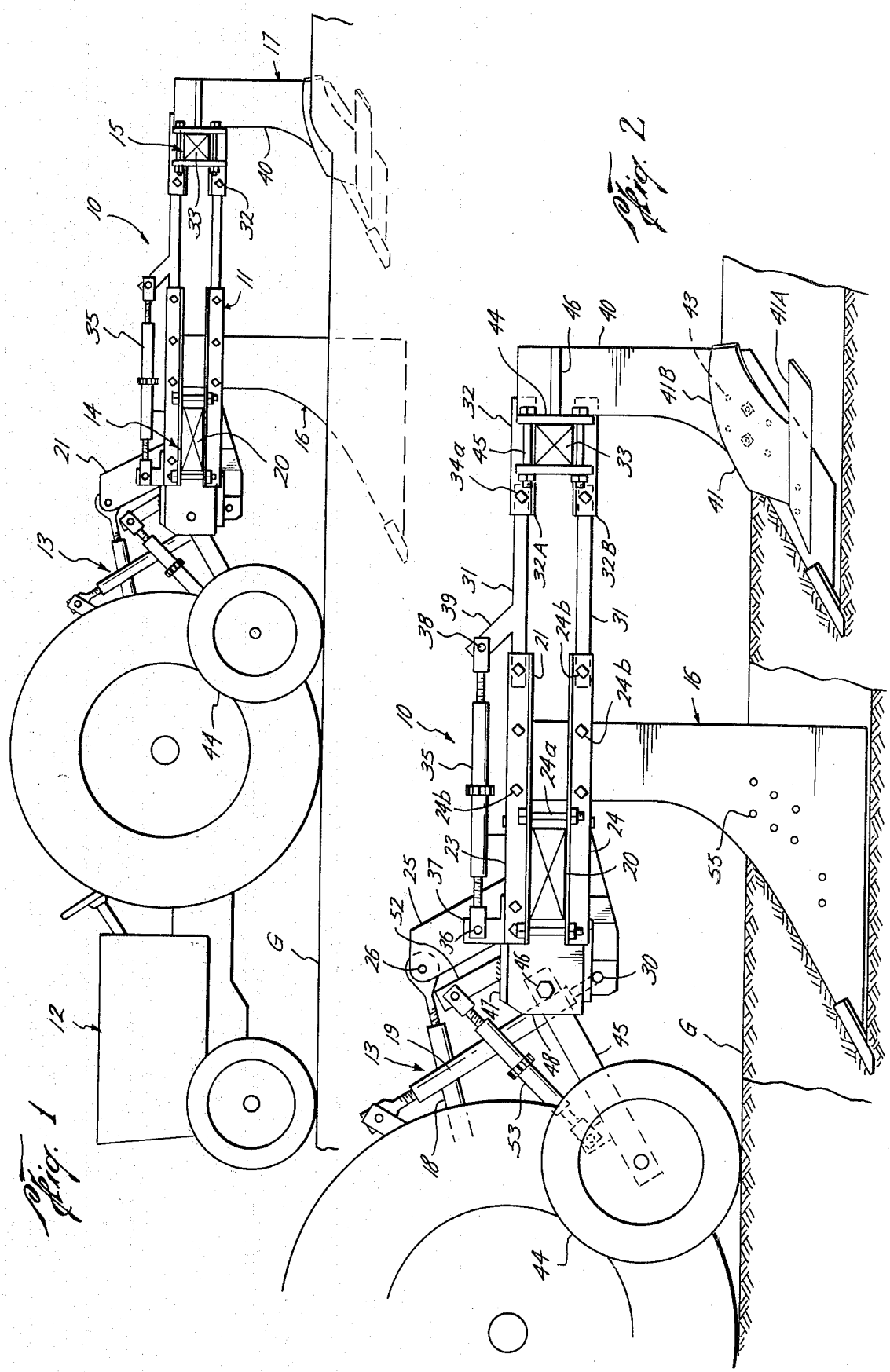

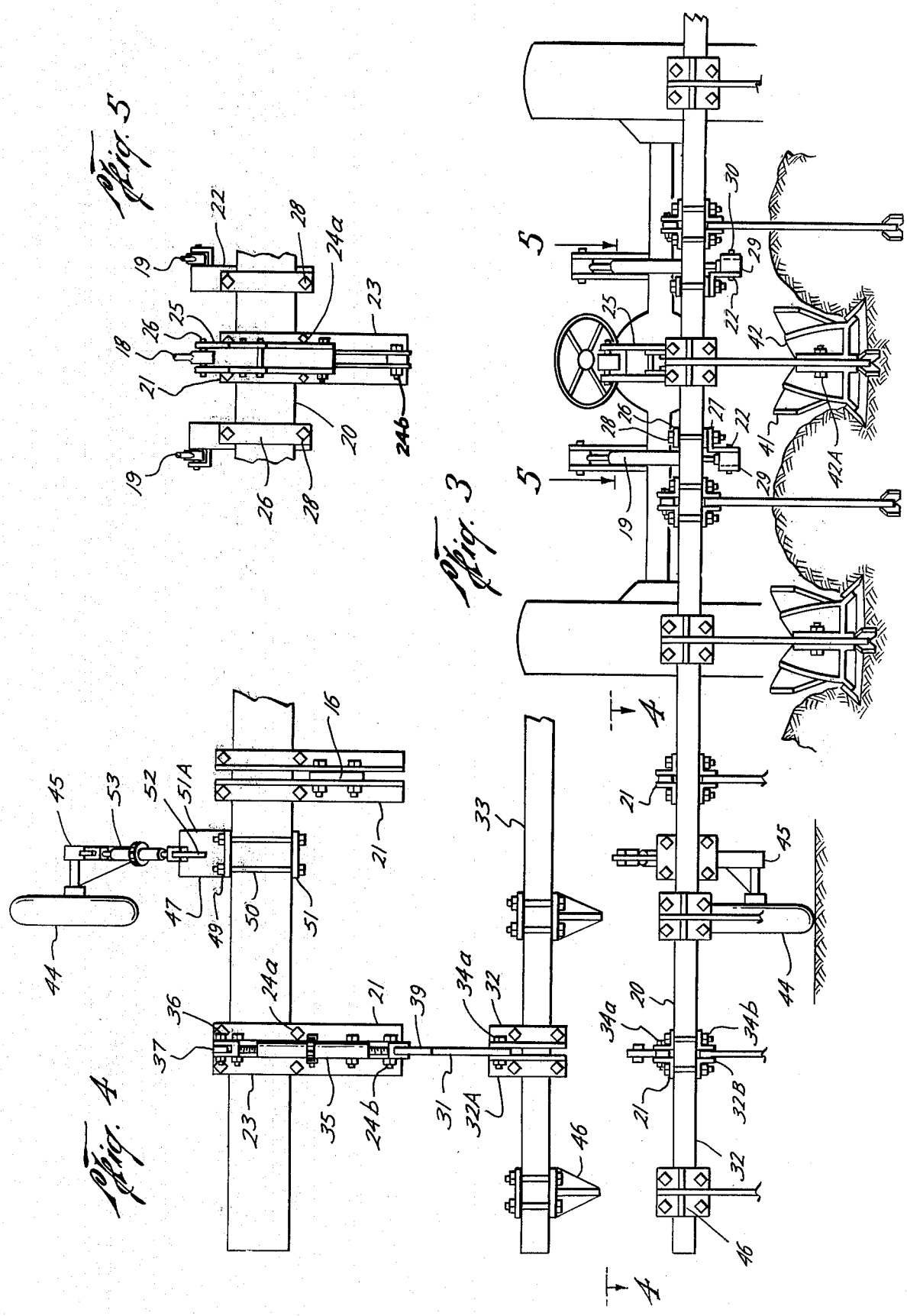

FARM IMPLEMENT

This is a continuation of application, Ser. No. 1,435, filed Jan. 8, 1979 and now abandoned, by William H. Helbig and Barry F. Cornell, and entitled Farm Implement.

This application relates to improvements in farm implements which are useful in loosening the soil to facilitate plant growth and water penetration as well as in plowing out stalks and roots of previous plants, performing minimum tillage, and otherwise forming beds in preparation for planting.

U.S. Pat. No. 3,289,771 shows an implement having chisels (also known as subsoilers) mounted in laterally spaced relation along a tool bar attached to the hitch of a tractor so as to form longitudinally extending trenches which break the hard pan and facilitate water penetration. Sweeps are suspended in laterally spaced relation from another tool bar carried by and behind the first-mentioned tool bar for turning soil onto the trenches to form beds thereover. In this implement, the hitch is of a type which automatically raises and lowers the front tool bar, and thus the chisels, in response to draft; and the rear tool bar is connected to the front tool bar by a parallelogram linkage which permits the sweeps to rise and fall relative to the chisels while maintaining predetermined horizontal relationships with the ground level. Gauge wheels are mounted on the rear tool bar to engage the ground outboard of the linkage in order to determine penetration of the sweeps independently of the rise and fall of the chisels responsive to draft.

The above-described implement not only requires a tractor with a special type hitch, but also, because of the hitch, permits the chisels to penetrate to varying depths depending on soil conditions. Furthermore, even though the rear tool bar floats freely with respect to the front tool bar, and thus independently of the draft responsive hitch mechanism, the elevation of the sweeps supported thereon can be maintained at constant elevation, in order to insure uniform beds, only through the gauge wheels, and, due to their location on the implement, the gauge wheels may encounter clods turned up by the chisels or other obstructions in their path, which in turn would raise the sweeps and thus reduce the size of the beds. Still further, the location of the gauge wheels, as above described, may cause trash to accumulate between them and laterally adjacent portions of the frame.

In the farm implements of U.S. Pat. Nos. 3,554,296 and 3,667,550, on the other hand, listers are mounted on chisels which are in turn supported in laterlly spaced-apart relation on a single tool bar adapted to be attached to a tractor hitch. More particularly, the listers are releasably attached to the chisels in such a way as to permit them to be vertically adjusted with respect thereto between positions in which their lower ends are at different levels above the lower ends of the chisels. Penetration of the chisels not only forms longitudinally extending trenches to promote water penetration and loosen the soil to allow the listers to penetrate more easily, but also tends to maintain the listers at a relatively constant elevation. In use of this implement, the trenches are formed in existing beds, and new beds are formed by the listers over existing furrows, the size of the new beds being determined by the level of the listers vertically with respect to the chisels on which they are mounted. Although such an implement overcomes many of the shortcomings of the prior art, including U.S. Pat. No. 3,289,771, it is necessary, in order to return the beds to their original positions, and to cover the trenches, to run the implement back over the bedded field. One problem with doing so is that the tractor wheels will, during the second run, compact the soil of at least part of the previously formed beds, which compaction is detrimental to root growth and water penetration.

An object of this invention is to provide a farm implement of this type which may be used to form trenches in the existing rows and new beds over the trenches, so that only one run of the implement is required, while at the same time maintaining the chisels and listers or other bed forming means at constant depths so as to insure uniform penetration and bed formation.

Another object is to provide a farm implement of the type above described which, with minor modification and requiring no additional parts, may be converted to one in which, if desired, trenches may be formed in the existing rows and beds formed on opposite sides thereof, in the manner of the farm implements of U.S. Pat. Nos. 3,554,296 and 3,667,550.

A further object is to provide such a farm implement which permits the depth of the trenches and the size of the beds to be varied independently of one another.

These and other objects are accomplished, in accordance with the illustrated embodiment of the invention, by means of a farm implement which is similar to that of U.S. Pat. No. 3,289,771, in that it has laterally spaced-apart chisels which form trenches in the ground as the frame on which they are supported moves forwardly thereover, and means for turning soil onto the trenches to form beds thereover. However, as compared with the earliest implement, the chisels are supported on a forward section or tool bar of the frame which is attachable to a tractor hitch which is not draft responsive, but instead of more conventional construction which permits the forward frame section to be lowered from a raised, transport position to a position in which the chisels supported on the forward frame section are free to penetrate the soil to a depth determined by gauge wheels or the like. Then, of course, the hitch may be operated to raise the forward frame section and lift the chisels from the soil for transport purposes.

Also, the bed forming means are supported on a rearward section or tool bar mounted on and behind the forward section by means of a parallelogram linkage for raising and lowering the bed forming means with respect to the forward section, and means are provided for so raising and lowering the rearward end of the linkage, and thus the rearward frame section, with respect to the forward frame section. Inasmuch as the hitch is not draft-responsive, the chisels supported on the front frame section will be maintained by the gauge wheels in a predetermined vertical position so as to uniformly penetrate the ground. At the same time the rear frame section from which the bed forming means is supported is held in a fixed vertical position with respect to the front frame section, so that it too is maintained in a predetermined vertical location with respect to ground level so as to form uniform beds over the trenches dug by the chisels.

In the preferred and illustrated embodiment of the invention, gauge wheels are pivotally mounted on the forward frame section in position to engage the ground forwardly of the chisels. In this way, the gauge wheels are unaffected by clods dug up by trailing chisels, which might otherwise interfere with its intended function in determining the elevation of the forward frame section and thus the depth to which the chisels penetrate the soil.

Preferably, the bed forming means comprise listers mounted on additional chisels supported on the rearward frame section. As illustrated, the lister is made up of lister halves connected to opposite sides of each rear chisel, much in the manner shown in U.S. Pat. Nos. 3,554,296 and 3,667,550. Thus, as shown in these earlier patents, the lower ends of the listers are above the lower ends of the chisels supported on the forward frame section so that the chisels not only loosen the soil intermediate the portions thereof loosened by the front chisels, but also penetrate the ground in order to facilitate penetration of the listers and maintain them at predetermined elevations. More particularly, the listers are removable from the rearward chisels and mountable on the forward chisels so as to permit the implement to be used in building beds on opposite sides of the trenches, as in the case of the aforementioned U.S. Pat. Nos. 3,554,296 and 3,667,550.

The depth to which the front sets of chisels penetrate the soil may be raised or lowered by adjustment of the gauge wheels, and the bed forming means may be raised and lowered with respect to the front set of chisels by adjustment of the inclination of the links of the parallelogram linkage. Also, the listers are adapted to be raised and lowered with respect to the chisels on which they are mounted, whether the front set or the rear set.

In the drawings, wherein like reference characters are used throughout to designate like parts:

FIG. 1 is a side elevational view of an implement constructed in accordance with the present invention and mounted on the rear of a tractor to permit it to be moved forwardly over the ground level;

FIG. 2 is an enlarged side elevational view of the implement, similar to FIG. 1, but on an enlarged scale and with the ground broken away to show the lower portions of the chisels and bed forming means;

FIG. 3 is a partial end view of the implement, as shown in FIG. 1, and with a portion of the ground broken away to show the formation of the beds, over trenches dug by the chisels;

FIG. 4 is a top plan view of a portion of the implement, as seen along broken lines 4—4 of FIG. 3; and FIG. 5 is a top plan view of another portion of the implement, as seen along broken lines 5—5 of FIG. 3.

With reference now to the details of the above-described drawings, the implement, which is indicated in its entirety by reference character 10, is shown to comprise a frame 11 attached to the rear end of a tractor 12 by means of a three-point hitch 13. The frame includes a front section 14 connected to the hitch and a rear section 15 mounted on the front section. Chisels 16 are supported on the front frame section 14 in laterally spaced-apart relation, and bed forming means 17 are supported from the rearward frame section in laterally spaced-apart relation, but laterally staggered with respect to the chisels 16, both intermediate adjacent chisels and laterally outboard of the outboard chisels.

Thus, as will be described to follow, as the implement 10 is moved forwardly over the ground level, chisels 16 form longitudinal trenches in the ground, and the bed forming means 17 turn soil toward the trenches formed by the chisels in order to build beds thereover. More particularly, and as will be described to follow, in the preferred and illustrated embodiment of the invention, the bed forming means is of such construction that it also forms trenches in the ground intermediate the formed beds.

As illustrated diagrammatically in the drawings, the hitch 13 is of the conventional three-point type (in this case, category III) in that it includes three arms, arranged in a generally triangular pattern and including a center arm 18 and a pair of outer arms 19 which extend rearwardly and downwardly on opposite sides of the center arm. As best shown in FIG. 2, each arm has means thereon by which it may be extended or retracted so as to adjust the attitude of the implement connected thereto with respect to ground level. As also well known in the art, the hitch includes suitable controls (not shown) on the tractor which permit its arms to be raised and lowered, and thus to raise or lower the implement connected thereto, for purposes previously described. Of course, other well known hitches, such as the "quick hitch" or a three-point hitch on a tool carrier for use on a drawbar tractor, may also be used.

Front frame section 14 includes a laterally extending tool bar 20 which is connected to center arm 18 of the three-point hitch by means of a bracket 21 and to each of the outer arms 19 by means of a bracket 22. Bracket 21 comprises upper and lower sets of angles 23 and 24, with one angle of the upper set being connected to an angle of the lower set by means of vertical bolts 24a extending between the angles on the front and rear sides of tool bar 20. Additional horizontal bolts 24b extend laterally through each of the upper and lower sets of flanges so as to connect them to one another. Upstanding arms 25 are arranged on the outer sides of the upwardly extending legs of the upper set of angles, and are connected thereby by the bolts 24b which connect the upper set of angles. The rearward end of the center arm 18 of the three-point hitch 13 is pivotally connected to arm 25 by means of pins 26.

Each bracket 22 comprises upper and lower plates 26 and 27 which are connected to tool bar 20 on opposite sides of bracket 21 by means of bolts 28 extending vertically between the plates on the front and rear sides of the tool bar. Lower flange 27 has a depending leg which mounts a U-shaped portion 29 in position to receive a pin 30 pivotally connecting the lower end of each outer arm 19 of the three-point hitch to a bracket 22. Of course, brackets of other construction may be required for attachment to other types of three-point hitches.

Each of the chisels 16 is supported from front tool bar 20 by means of additional brackets 21 mounted in laterally spaced-apart relation along the length of the front tool bar, as best shown in FIG. 3. As previously described in connection with the bracket to which arm 18 of the three-point hitch is connected, each bracket 21 comprises upper and lower sets of angles 23 and 24. As previously described, the angles of each set are connected to one another in laterally spaced-apart relation by means of horizontally extending bolts, and one angle of each set is connected to an angle of another set by means of vertically extending bolts 24b.

As shown, and as well known in the art, each chisel 16 comprises a heavy shaped steel plate which has a relatively narrow cross section so as to form a narrow trench longitudinally of the ground over which the implement is moved. More particularly, the chisels includes an upper shank which is connected to bracket 21 and a lower portion which projects forwardly, and over the lower end of which a point 31 is mounted on the lower front end of the chisel to form a hard surface for penetrating and breaking the soil as the chisel is pulled therethrough. As shown in the drawings, the rearward portion or heel of the chisel is preferably square—i.e., the rear edge of the chisel extends vertically from its upper to its lower edge to intersect with its lower, generally horizontally extending edge.

As shown in the drawings, the shank of each chisel 16 fits between the laterally spaced upper and lower sets of angles of the bracket 21, and is connected to both sets of angles by means of two sets of horizontally extending bolts 24b. As illustrated, the implement has six such chisels and mounting brackets, three on each side of the attachment of tool bar 20 to the tractor. In the event an uneven number of chisels 16 are to be used, the center chisel would be mounted on the center bracket 21 to which arms 25 are connected. Thus, as shown in FIG. 5, the angles of center bracket 21 are held apart by a spacer to provide a slot in which the shank of such a chisel may be received. A third set of horizontal bolts 24b, which extends through the angles and the spacer, is useful for another purpose in the case of certain other brackets 21, as will be described to follow.

The rearward frame section 15 is mounted on forward frame section 14 by means parallelogram linkages each comprising links 31 having their forward ends pivotally connected to the rearmost third set of bolts 24b extending between upper and lower angles 23 and 24 of a bracket 21, and their rearward ends pivotally connected by bolts 34a to a bracket 32 connected to a laterally extending tool bar 33. As shown, each bracket 32 comprises upper and lower sets of angles 32A and 32B connected in laterally spaced-apart relation to the upper and lower sides of the rearward tool bar 32. For this purpose, the upper set of angles are connected by horizontal extending bolts 34a, and one angle of each set is connected to an angle of the other set by means of vertical bolts 34b.

Since the linkage extends rearwardly from a bracket 21 on which a chisel 16 is supported, it, like the chisel, is located laterally intermediate adjacent bed forming means 17. In the illustrated embodiment of the invention, there are a pair of linkages, each connected to a bracket 21 supporting an outboard chisel 16.

As previously described, parallelogram links 31 are adjustable to permit the rearward frame section 15, and thus the bed forming means 17, to be raised and lowered to different vertical levels with respect to the forward frame section 14, and thus the chisels 16. This is accomplished by means of an extendible and retractable rod 35 pivotally connected at its forward and rearward ends to a portion of the front frame section and to one of the links, respectively. Thus, as shown, the forward end of rod 35 is connected by pin 36 to an upstanding arm 37 connected to the upper set of angles 23 of bracket 21, and the rearward end of each such rod is connected by pin 38 to an upwardly and forwardly extending arm 39 on the upper link 31.

As shown, the rod 35 includes a center tubular section having its opposite ends threadedly connected to outer end portions which mount the pins 36 and 38, whereby rotation of the section in one direction or the other effectively extends or retracts the rod. A toothed ring is provided about the center section to facilitate its rotation by means of a suitable ratchet mechanism. Obviously, lengthening of the rod will lower the rearward section with respect to the forward section, while shortening thereof will raise the rearward section with respect to the forward section. When moved to the desired elevation, the rearward section is, however, held in a fixed vertical position with respect to the forward frame section. Alternatively, this rod may be extended and retracted hydraulically or electrically.

In its preferred form, each of the bed forming means 17 comprises an assembly similar to that shown and described in each of the aforementioned U.S. Pat. Nos. 3,554,296 and 3,667,550. Thus, each includes a chisel 40 generally similar in construction to chisel 16, including a shank at its upper end connected to the rearward frame section 15, but of somewhat smaller size in profile, and having its rearward end shaped as shown in FIGS. 1 and 2, rather than square as in the case of chisels 16. As described in the aforementioned patents, a lister is mounted on the chisel with a shear blade 41A at its lower end above the lower edge of the chisel. More particularly, the lister is made up in halves 41, each of which has a moldboard 41B above shear blade 41A which is connected to a bracket or frog 42, which in turn is connected to opposite sides of the chisel by means of bolts 42A. As also described in the aforementioned patents, there are a plurality of vertically spaced sets of holes 43 in the chisel to receive bolts 42A and thus permit the lister halves to be connected thereto at different elevations.

The upper end of the shank of each chisel 40 is of modified construction in that it has a plate 44 extending laterally across its front edge to permit its attachment to rear tool bar 33. More particularly, plate 44 attaches to the tool bar 33 by means of bolts 45 which extend horizontally above and below the tool bar to connect plate 44 with another plate 45 on the front side of tool bar 33. The connection of the plate to the forward edge of the chisel is reinforced by means of gusset plates 46.

As will be appreciated, the above-described attachment of the shank of chisel 40 to rear tool bar 33 permits the bed forming means 17 to be mounted at any desired location along the length of such bar. Preferably, one such bed forming means trails each tractor wheel, as shown in FIG. 3. Similarly, of course, brackets 21 permit front chisels to be mounted at any desired location along the length of front tool bar 20. Consequently, the chisels and bed forming means may be arranged in laterally staggered relation as shown, and are adapted to forming beds in rows of different widths.

As previously described, hitch 13 is of conventional construction, and in particular is not draft responsive, so that it may be operated to lower the front frame section to an elevation determined by gauge wheels 44 mounted on the forward frame section on opposite sides of tractor 12. More particularly, the gauge wheels are mounted forwardly of chisels 16, and thus out of the way of trash which might accumulate at the front and sides and to the rear of the chisels.

Since the gauge wheels are mounted on the forward frame section, their elevation relative to chisels 16 will determine the depth to which the chisels penetrate the soil. Thus, the elevation of the gauge wheels may be raised or lowered with respect to the forward frame section, as will be described to follow, so as to increase or decrease, respectively, the penetration of chisels, 16. The point of each such chisel will dig into the soil, as the hitch lowers the forward frame section, until gauge wheels 44 rest upon the ground level. Then, as the implement is moved forwardly, the chisels 16 will dig in further to force the gauge wheels firmly against the ground level, and thus maintain the elevation of the chisels.

As shown, the axle of each gauge wheel is supported on the lower end of an arm 45 pivotally connected by bolt 46 to a bracket 47 mounted on the forward tool bar 20. The bracket includes a vertically disposed plate 48 and a laterally extending plate 49 at the rearward end of plate which may be attached to the tool bar 20 by means of rearwardly extending bolts 50 connecting with another plate 51 on the rearward side of the tool bar. Another plate 51 extending horizontally from the upper edge of plate 48 supports an upstanding arm 52, and an extendible and retractable rod 53, similar to rod 35, extends between and is pivotally connected at its opposite ends to the arm 52 and the arm 45, so that the gauge wheel may be raised and lowered with respect to the forward frame section in an obvious manner.

Each of chisels 16 and 40 can be and usually is of the same thickness, and the forward chisels 16 have sets of holes 55 formed therein which are spaced longitudinally from one another the same distance as the sets of holes 43 in chisels 40. Consequently, and as previously described, the implement shown and described above may be converted to one of the type shown and described in the aforementioned U.S. Pat. Nos. 3,554,296 and 3,667,550, merely by disconnecting the lister halves 41 from the rearward chisels 40 and connecting them to the forward chisels 16. When the implement is converted in this manner, chisels 40 and the parts which connect them to the rearward frame section, as well as the parallelogram links 31 connecting the rearward section of the forward section, may be disconnected and removed from the implement to lighten its weight. Alternatively, the chisels 40 alone may be left in place for enhancing the water penetration of the ground along the centers of the beds formed by the lister halves mounted on the forward chisel 16.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A farm implement, comprising a frame adapted to be moved forwardly over the ground level, including a forward section having means thereon for attachment to a tractor by means of a three point hitch, a rearward section, means mounting the rearward section from the forward frame section for raising and lowering the rearward frame section with respect to the forward section and holding it in said raised or lowered position, subsoil chisels supported in laterally spaced-apart relation on the forward frame section for form longitudinally extending trenches in the ground as the frame moves forwardly thereover, gauge wheel means mounted on the forward frame section for engaging the ground level to determine the elevation of the subsoil chisels, additional subsoil chisels each supported in laterally spaced relation on the rearward frame section so as to penetrate the soil rearward and laterally intermediate the trenches formed by the subsoil chisels supported on the forward frame section, and a plurality of listers each mounted on one of the additional subsoil chisels.

2. A farm implement of the character defined in claim 1, wherein each lister is removable from the additional subsoil chisel on which it is mounted and mountable on one of the front subsoil chisels.

3. A farm implement of the character defined in claim 1, wherein the mounting means includes a parallelogram linkage connecting the frame sections to one another, and an extendible and retractable means connecting the linkage to one of the frame sections.

4. A farm implement of the character defined in claim 1, wherein the gauge wheel means comprises at least one gauge wheel pivotally mounted on the forward frame section in position to engage the ground level forwardly of the front set of subsoil chisels.

5. A farm implement of the character defined in claim 4, wherein said gauge wheel means also includes extendible and retractable means for raising and lowering each wheel with respect to the forward frame section.

* * * * *